June 19, 1945.  B. F. McNAMEE  2,378,491
VISCOSIMETER
Filed April 18, 1944

Inventor
Bernard F. McNamee
By Lyon & Lyon
Attorneys

Patented June 19, 1945

2,378,491

UNITED STATES PATENT OFFICE 2,378,491

VISCOSIMETER

Bernard F. McNamee, Altadena, Calif., assignor to The Superior Oil Company, Los Angeles, Calif., a corporation of California Application April 18, 1944, Serial No. 531,537

4 Claims. (Cl. 73—56)

This invention relates to devices for determining the viscosity of fluids and is particularly useful in making continuous indications of the viscosity of colloidal solutions and of liquids carrying solid matter in suspension.

A general object of the invention is to provide a relatively simple and reliable apparatus for continuously indicating the viscosity of a fluid with consistent accuracy.

Another object is to provide a continuous viscosimeter capable of handling heavy, gelatinous suspensions, such as drilling mud, without clogging.

A more specific object is to provide a continuous viscosimeter in which all parts liable to accumulate sediment are so mounted that they can be kept clean either by vibration or by continuous washing.

Various other, more specific, objects and features of the invention will become apparent from the detailed description to follow of a specific embodiment of the invention illustrated in the drawing.

My invention is based on the phenomenon that although the flow of liquid through a tube varies inversely with the viscosity of the liquid flow through an orifice having walls of negligible length in the direction of flow is substantially independent of viscosity. To utilize this phenomenon in a practical viscosimeter, I deliver the fluid to be tested, under constant head, to two discharge nozzles, one of which is in the form of a tube of substantial length relative to its diameter, and the other of which is an orifice of negligible length compared to its diameter, and compare the rates of flow through the two nozzles. Various methods may be employed for comparing the rates of flow, but a relatively simple one is to cause the streams issuing from the respective nozzles to drive separate fluid motors which are caused to react differentially on an indicator. If the viscosity increases, the rate of flow through the tube diminishes relative to the rate of flow through the orifice, thereby increasing the differential force created by the two motors and causing an indicator to move in one direction. The indicator can be caused to move over a calibrated scale so as to read viscosity directly.

Referring to the drawing.

Figure 1:
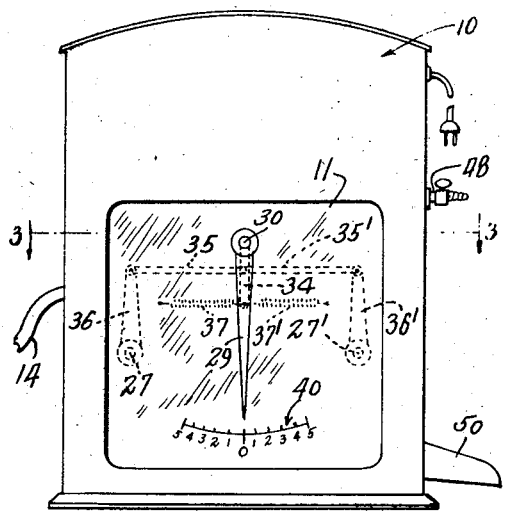
Fig. 1 is a front elevation of a viscosimeter in accordance with the invention.

The device shown in the drawing comprises an enclosing and supporting box or case 10 within which all of the apparatus is mounted. The front wall of the case may include a window 11 through which the indicating-hand and scale of the device are visible.

The mechanism includes a tank 12 into which a liquid to be tested is continuously delivered through an inlet pipe 13 which may be connected to the source of liquid (not shown) by a flexible tube 14 extended through an aperture provided therefor in the wall of the housing. The inlet pipe 13 delivers liquid into the tank 12 tangentially, as shown in the horizontal view of Fig. 3, so as to cause the liquid to swirl in the tank and help to maintain solid materials in suspension. The inlet pipe is capable of supplying liquid faster than it is discharged from the lower part of the tank so that it continuously overflows at a lip 15 (Fig. 2), thereby maintaining a constant level in the tank. A central waste pipe 16 may be provided at the center of the bottom of the tank to drain off what sediment may settle to the bottom of the tank and thereby prevent it from accumulating in the tank and obstructing flow through the discharge nozzles.

The test discharge nozzles are two in number and comprise a hole 17 in one side of the tank, which will be hereinafter referred to as the "orifice," and a tube 18, which extends horizontally and radially from the tank in the opposite direction and will be hereinafter referred to as the "tube," to distinguish it from the orifice 17.

As a result of the head of liquid maintained in the tank 12, jets of the liquid are constantly discharged from the orifice 17 and the tube 18, respectively, and impinge on paddle wheels 19 and 19', respectively, which constitute fluid motors which rotate at speeds very nearly proportional to the rates of flow of liquid in the jets which impinge on them. In conformity with the flow law previously mentioned, the rate of flow through the orifice 17 remains substantially constant despite variations in the viscosity of the liquid, whereas the flow through the tube 18 diminishes noticeably with a relatively small increase in viscosity. The viscosity can therefore be measured by comparing the speed output of the paddle wheel 19 with that of the paddle wheel 19'. A convenient way of comprising these speeds is disclosed in the drawing.

Figure 3:
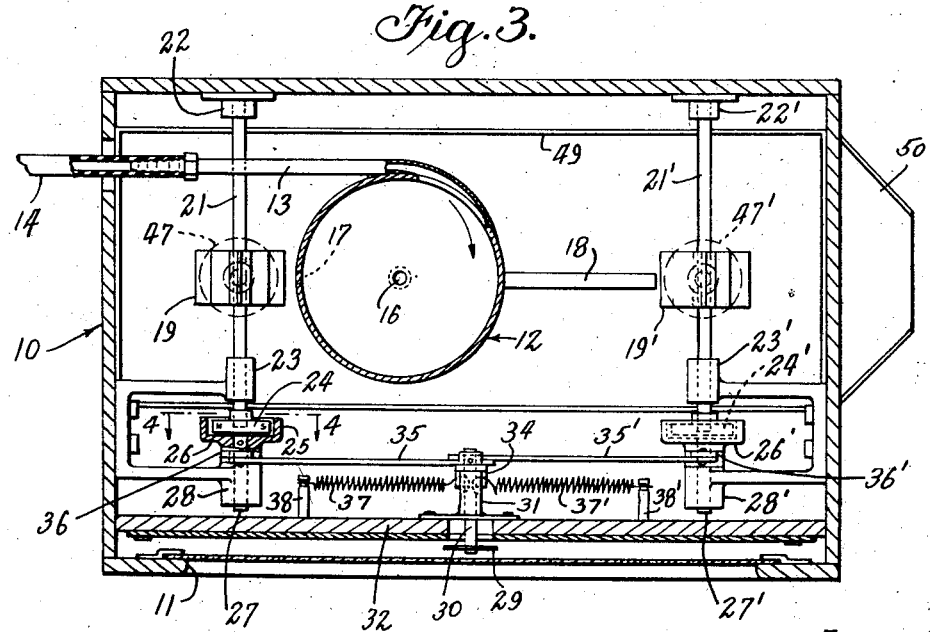
Fig. 3 is a horizontal section, taken substantially in the plane III—III of Fig. 1.
Figure 4:
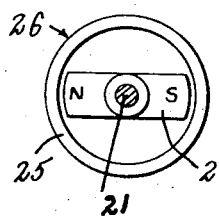
Fig. 4 is a detail, vertical section taken in the plane IV—IV of Fig. 3.

Thus, referring to Fig. 3, the paddle wheel 19 is mounted on a shaft 21 journaled at its opposite ends in bearings 22 and 23. On its front end the shaft 21 carries a magnet 24, the poles of which are adjacent the cylindrical wall 25 of a conductive metal cup 26 secured to a shaft 27 which is rotatably supported in a bearing 28 coaxial with the shaft 21. The magnet 24 and the cup 25 constitute a well-known structure commonly employed in speedometers for applying a torque to one member proportional to the speed of another. In this instance the rotating magnet 24, rotating in unison with the paddle wheel 19, produces a torque on the cup 26 proportional to the speed of rotation of the magnet, this torque being in a clockwise direction, looking at the front of the device.

The other paddle wheel 19' is similarly mounted on a shaft 21' supported in bearings 22' and 23' and carries on its front end a magnet 24' cooperating with a cup 26' on a shaft 27' rotatably supported in coaxial relation with the shaft 21' by a bearing 28'. The paddle wheel 19' rotates in a direction opposite to the paddle wheel 19, and the cup 26' tends to rotate in a counter-clockwise direction, looking at the front of the instrument.

In accordance with the present invention, I couple the cups 26 and 26' to each other and to an indicating hand so that the torques developed in the two cups oppose each other and move the indicator hand an amount proportional to the difference in the torque. To this end a hand 29 is fixed to a shaft 30, the latter being journaled in a bearing 31 fixed to a wall 32 of the casing 10. The rear end of the shaft 30 has secured thereto a downwardly depending arm 34 (Fig. 1), which arm is pinned to the right end of a horizontal link 35' and the left end of a horizontally extending link 35'. The left end of the link 35 is pinned to an upwardly extending arm 36 on the shaft 27 and the right end of the link 35 is similarly pinned to the upper end of an arm 36' fixed to the shaft 27'. The arm 34 extends downwardly and forwardly below its point of connection to the links 35 and 35' and is connected to the inner ends of a pair of centering springs 37 and 37' which are anchored at their outer ends to pins 38 and 38' on the wall 32. These springs 37 and 37' retain the hand 29 in a predetermined neutral position when the opposite forces applied to the hand through the links 35 and 35' are equal, and yieldingly oppose the movement of the hand in either direction when the forces applied thereto are unequal.

As shown in Fig. 1, the hand 29 cooperates with a scale 40 which is calibrated in opposite directions from a central zero point. This is, of course, a purely arbitrary scale and any type of scale that may be desired may be substituted for the one shown.

It is believed that the operation of the device is apparent from the description already given. However, it may be briefly summarized as follows:

The inlet pipe 13 keeps the tank 12 filled to overflowing at the lip 15, thereby maintaining a constant level of liquid in the tank, which produces jets of liquid from the orifice 17 and the tube 18, respectively. The rate of flow through orifice 17 is substantially independent of, and the rate of flow through tube 18 is inversely proportional to the viscosity of the liquid. The two jets rotate the paddle wheels 19 and 19' in opposite directions and the paddle wheels rotate their associated magnets 24 and 24'. The rotation of each magnet produces a torque on its associated cup 26 or 26' which is proportional to its speed, and these torques are applied through arms 36 and 36', the links 35 and 35' the arm 34 and the shaft 30 to the hand 29, thereby causing it to assume a position on the scale 40 that is determined by the relative speeds of the two paddle wheels. Since the relative speeds of the paddle wheels is a function of the relative rates of flow through orifice 17 and tube 18, respectively, which in turn is a function of the viscosity of the liquid, the position of the hand 29 affords an indication of the viscosity.

Of course an important element in determining the rate of flow through the orifice 17 relative to that through the tube 18 is the pressure of the liquid in the bottom of the tank 12 and this pressure is a function not only of the depth of the liquid (which is maintained constant by the overflow lip 15), but also of the density of the liquid. However, variations in density produce like variations in the pressure applied to both the orifice 17 and the tube 18 so that the effect of density variations on the reading obtained is negligible, as compared to the effect thereon of viscosity changes.

Figure 2:
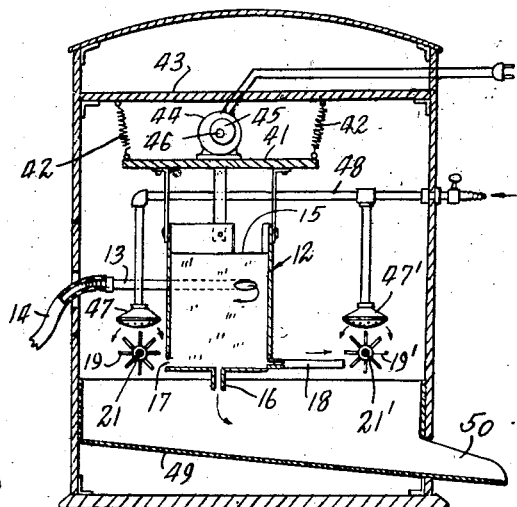
Fig. 2 is a vertical section through the device looking in the same direction as in Fig. 1.

When handling certain gelatinous solutions or suspensions, such as drilling mud, it is sometimes necessary to take special precautions to maintain it in liquid condition. The present apparatus lends itself to this particular purpose since it is feasible to vibrate the tank 12 and to continually wash the paddle wheels 19 and 19'. Thus, as shown in Fig. 2, the tank 12 may be suspended from a platform 41 which in turn is suspended by springs 42 from a horizontal wall 43 in the casing 10. The platform 41 has mounted thereon any suitable vibrating device, which, in this instance, is shown as an electric motor 44 having a weight 45 eccentrically secured to the motor shaft 46 so that the motor vibrates when it is energized. An arrangement of this sort sets up a very rapid, but minute, vibration of the tank 12 that is very effective in preventing fluid, such as drilling mud, from jelling. The vibration of the tank 12 is insufficient to change its position with respect to the paddle wheels 19 and 19' enough to impair the accuracy of the instrument.

To prevent the accumulation of deposits on the paddle wheels 19 and 19', spray nozzles 47 and 47', respectively, may be mounted thereabove and supplied with water or other solvent liquid through pipes 48. A common trough 49, having a discharge spout 50 at one end, is positioned to collect the fluid discharged from the spray nozzles 47 and 47', the orifice 17, the tube 18, the sediment discharge opening 16 and the overflow lip 15.

I have found that flow through the tube 18 is very nearly inversely proportional to the viscosity, so long as the velocity of the liquid therethrough is sufficiently low to produce laminar flow. If the velocity of the fluid is increased to the point where the flow becomes turbulent, the variation of the rate of flow with a change in viscosity is much less uniform. In a device of the type disclosed I have found that if the tube 18 is one-half inch in diameter and 15 inches long, the flow remains substantially laminar for heads up to approximately 8 inches, when testing a gelatinous drilling mud.

For the purpose of explaining the invention a specific embodiment thereof has been described in substantial detail. It is to be understood, however, that numerous changes from the exact construction disclosed will be obvious to those skilled in the art, and the invention is, therefore, to be limited only to the extent set forth in the appended claims.

I claim:

1. A viscosimeter for fluids containing solid matter in suspension, comprising first and second nozzle means for discharging first and second jets, respectively, of a fluid to be tested, said respective nozzle means having flow characteristics that vary in different degree with changes in viscosity of the fluid, means for continuously supplying fluid to be tested to said two nozzle means at the same relative pressures, first and second fluid motor means respectively responsive to said first and second jets, and indicator means differentially responsive to said two motor means for indicating the relative rates of flow through said two nozzle means, said means for continuously supplying fluid to be tested to said two nozzle means comprising a tank rigidly connected to said nozzles and in fluid communication therewith, means for delivering fluid to said tank at a rate to maintain a substantially constant head for both jets, and means for vibrating said tank to agitate the fluid therein and maintain the solid matter in suspension.

2. A viscosimeter for fluids containing solid matter in suspension, comprising first and second nozzle means for discharging first and second jets, respectively, of a fluid to be tested, said respective nozzle means having flow characteristics that vary in different degree with changes in viscosity of the fluid, means for continuously supplying fluid to be tested to said two nozzle means at the same relative pressures, first and second fluid motor means respectively responsive to said first and second jets, and indicator means differentially responsive to said two motor means for indicating the relative rates of flow through said two nozzle means, said means for continuously supplying fluid to be tested to said two nozzle means comprising a cylindrical tank provided with a constant head overflow means and to which tank the said nozzles are secured, said nozzles extending radially from the side wall of said tank, means for delivering fluid tangentially into said tank, and means forming an auxiliary discharge passage in the center of the bottom of the tank for the discharge of sediment, said inlet means being of sufficient capacity to maintain a predetermined level of liquid in said tank despite constant discharge therefrom through said two nozzle means and said sediment discharge passage.

3. A viscosimeter for fluid containing sediment, comprising first and second nozzle means for discharging first and second jets, respectively, of a fluid to be tested, said respective nozzle means having flow characteristics that vary in different degree with changes in viscosity of the fluid, means for continuously supplying fluid to be tested to said two nozzle means at the same relative pressures, first and second fluid motor means respectively responsive to said first and second jets, and indicator means differentially responsive to said two motor means for indicating the relative rates of flow through said two nozzle means, said fluid motors each comprising a fluid impelled wheel positioned in the jet issuing from its associated nozzle.

4. A viscosimeter comprising first and second nozzle means for discharging first and second jets, respectively, of a fluid to be tested, said respective nozzle means having flow characteristics that vary in different degree with changes in viscosity of the fluid, means for continuously supplying fluid to be tested to said two nozzle means at the same relative pressures, first and second fluid motor means including motor members continuously rotatable in response to impingement of fluid thereon from said first and second jets, and indicator means differentially responsive to the speeds of the said two motors for indicating the relative rates of flow through said two nozzle means, said indicator means including an indicator member with means for applying the force in one direction to said indicator member proportional to the speed of one of said motor members, and means for applying an opposite force to said indicator member proportional to the speed of said other motor member.

BERNARD F. McNAMEE.